Patented Sept. 26, 1950

2,523,633

UNITED STATES PATENT OFFICE 2,523,633

PREPARATION OF β-METHYLMERCAPTO-PROPIONALDEHYDE

Earl H. Pierson and Max Tishler, Rahway, N. J., assignors to Merck & Co., Inc., Rahway, N. J., a corporation of New Jersey No Drawing. Application October 25, 1945, Serial No. 624,598

1 Claim. (Cl. 260—601)

This invention relates to the preparation of substituted aldehydes by means of a chemical reaction using unsaturated aldehydes as the starting materials. More particularly, it relates to a new and improved process for preparing β-methylmercaptopropionaldehyde, $$CH_3.S.CH_2.CH_2.CHO$$

by reacting acrolein and methyl mercaptan at atmospheric pressure, the reaction being preferably carried out in the presence of a catalyst and/or polymerization inhibitor. Under these circumstances the reaction, carried out at normal atmospheric pressure conditions (approximately 760 millimeters of mercury pressure), takes place in accordance with the following equation:

$$CH_2=CH.CHO + CH_3SH \rightarrow CH_3SCH_2.CH_2.CHO$$

Previously in preparing β-methylmercaptopropionaldehyde from acrolein and a mercaptan it has been considered essential to carry out the reaction under a pressure greater than atmospheric. The compound has been prepared, for example, by heating acrolein and methyl mercaptan in a sealed tube, mercuric methyl mercaptide being utilized as the catalyst. Although high yields are claimed for this reaction which was carried out with only very minute amounts of the reactants, we have found that, in practice, especially when using amounts of the reactants comparable to those that would be utilized on the industrial scale, the yields are in all cases very low. Moreover, carrying out the reaction under a pressure greater than atmospheric requires the use of special pressure equipment, which is a distinct disadvantage for industrial operations. The reaction as carried out under pressure is also exothermic to a high degree, the amount of heat evolved, even when the reaction is carried out on only the laboratory scale, being such that the reaction rapidly gets out of control. In addition, the necessity of employing mercury methyl mercaptide as the catalyst in the pressure process described in the literature requires the separate preparation of this catalytic agent, thus introducing a further disadvantage. The isolation of the product from the reaction mixture when the sealed tube method described in the literature is employed is, moreover, exceedingly troublesome, owing to the vile odor and the high toxic nature of the reaction mixture and product.

We have now found that it is possible to prepare β-methylmercaptopropionaldehyde by reacting acrolein and methyl mercaptan by a process wherein the addition is effected at ordinary atmospheric pressure, the reaction being preferably carried out in the presence of a catalyst and/or polymerization inhibitor. Surprisingly enough, when the reaction is carried out at ordinary atmospheric pressure, especially when a catalyst and/or polymerization inhibitor is present, the yields are high and heat evolution is reduced to such an extent that cooling to control the reaction may be readily and easily applied even when operations are conducted on the industrial scale. Our process has the advantage, moreover, of not requiring the separate preparation of the catalyst before reacting the acrolein and methyl mercaptan, as the catalyst we utilize is readily formed in situ during the reaction. The reaction product, prepared under the less vigorous reaction conditions, is readily separated in the substantially pure state by distilling the reaction mixture, this distillation being advantageously carried out at a pressure less than normal atmospheric pressure. In fact, the product is so pure it can be used directly (without distillation or any other form of purification) for the synthesis of methionine without effecting the overall yield.

Among the catalysts that we have found satisfactory for use in our process we may refer to mercuric methyl mercaptide, copper acetate, benzoyl peroxide, and hydroquinone. Their efficacy may be due either in whole or in part to their effect in inhibiting polymerization of the acrolein, and it is very difficult in practice to differentiate between catalytic activity and polymerization inhibitor activity. Copper acetate may be converted to cupric mercaptide during the reaction, and it may be that this is the active catalyst and/or polymerization inhibitor, but the exact mechanism of the catalyzing action is not understood. Copper acetate is therefore to be regarded as the catalyst and/or polymerization inhibitor since it is added, as such, to the reaction mixture.

Benzoyl peroxide, when present in the reaction mixture, in all probability serves as an accelerator for the condensation.

The following examples are illustrative of our improved process for the manufacture of β-methylmercaptopropionaldehyde by reacting acrolein and methyl mercaptan at atmospheric pressure.

*Example 1*

A three-necked flask fitted with a stirrer, thermometer, gas inlet, and brine-cooled reflux condenser was charged with 56 grams (1.0 mole)

of acrolein. While maintaining an inside temperature of 15–20° C. by the occasional use of an ice bath, 53 grams (1.1 mole) of gaseous methyl mercaptan was passed into the reaction mixture during the course of 30 minutes. The batch was stirred for an additional 1.5 hours at 15–20° C. during which time there was further reaction as indicated by the evolution of heat. Vacuum distillation of the product gave 25.3 grams (yield 24%) of β-methylmercaptopropionaldehyde boiling at about 54° C. at 8 millimeters of mercury pressure.

Example 2

A three-necked flask fitted with a stirrer, thermometer, gas inlet, dropping funnel, and brine-cooled reflux condenser was charged with 53 grams (1.1 mole) methyl mercaptan and 0.35 gram mercuric methyl mercaptide. After admitting 56 grams (1.0 mole) of acrolein during the course of 15 minutes with an inside temperature of about 10° C., the temperature was allowed to rise spontaneously to 75° C., at which point an ice bath was applied. There was no indication of further reaction one hour after the addition of the acrolein. Distillation of the product gave 71 grams (yield 68%) of β-methylmercaptopropionaldehyde.

Example 3

The apparatus, mode of operation, and charge was identical with those used in Example 2, with the exception that the mercury catalyst was replaced by 0.5 gram of benzoyl peroxide. The acrolein was added during the course of 30 minutes at a temperature below 25° C. The reaction was very vigorous. After the completion of the addition of the acrolein, the ice bath was removed, and the temperature rose spontaneously to a maximum of 47° C. during the course of one hour. Distillation of the reaction mixture gave 60 grams (yield 58%) of β-methylmercaptopropionaldehyde.

Example 4

A three-necked flask fitted with a stirrer, thermometer, brine-cooled reflux condenser, and gas inlet tube was charged with 56 grams (1.0 mole) of acrolein and 0.5 gram of cupric acetate. Methyl mercaptan, 48 grams (1.0 mole), was passed into the reaction mixture during the course of 30 minutes. An ice bath was used occasionally to maintain an inside temperature of 35–40° C. At the beginning of the mercaptan addition the blue crystalline cupric acetate was transformed into a finely divided buff-colored solid—presumably cupric methyl mercaptide. The mixture was stirred for an additional hour at 35–40° C. after the completion of the mercaptan addition, and the mixture was then distilled giving 93.4 grams (yield 90%) of β-methylmercaptopropionaldehyde boiling at about 56° C. at 10 millimeters of mercury pressure.

Example 5

The temperature, charge, mode of operation, and apparatus were the same as in Example 4. Cupric acetate in the amount of 0.5 gram, and 0.5 gram of hydroquinone were used as catalyst and/or polymerization inhibitor. The methyl mercaptan was added during the course of 3.5 hours at 35–40° C., and there was no aging period after addition of the methyl mercaptan. Distillation of the product gave 93 grams (about 90% yield) of β-methylmercaptopropionaldehyde.

In carrying out our improved addition reaction it is possible to initiate the reaction at temperatures as low as 20° C. although, ordinarily, we do not recommend utilizing low temperatures because of the danger of delayed reaction. Temperatures as high as the reflux temperatures of acrolein may also be utilized, although temperatures of this elevation are ordinarily not desirable because of the danger of increased polymerization. Moreover very high temperatures introduce operational difficulties.

In general we prefer to carry out the reaction moderately rapidly, and we have obtained yields of 85% or higher by utilizing a reaction period of about three and one-half hours. The reaction product will slowly polymerize whether in the form of the crude reaction mixture, or as a substantially pure, twice-distilled product. This polymerization results in marked rise in the refractive index, and all samples of the product having values of $N_D^{25}$ in excess of 1.481 should usually be subjected to redistillation.

The above description and examples are intended to be illustrative only. Any modification of, or variations therefrom, which conform to the spirit of the invention, are intended to be included within the scope of the appended claim.

We claim:

The method of preparing β-methylmercaptopropionaldehyde which comprises reacting methyl mercaptan and acrolein at normal atmospheric pressure and at a temperature below the reflux temperature of acrolein in the presence of copper acetate.

EARL H. PIERSON.
MAX TISHLER.

REFERENCES CITED

The following references are of record in the file of this patent:

UNITED STATES PATENTS

| Number | Name | Date |
| --- | --- | --- |
| 2,352,435 | Hoeffelman et al. | June 27, 1944 |

OTHER REFERENCES

Rothstein, "Jour. Chem. Soc." (London), 1940, pages 1560 to 1563.

Kaneko et al., "Chemical Abstracts," vol. 33 (1939), page 2106.

Abstract of "Jour. Chem. Soc., Japan," vol. 59 (1938), pages 1382–1384.